United States Patent [19]
Davis

[11] 4,397,569
[45] Aug. 9, 1983

[54] SYSTEM FOR CORRELATING A SIGNAL SENSOR LOCATION WITH A RECORDER PRINTOUT

[75] Inventor: Richard H. Davis, Franklin, Tenn.

[73] Assignee: The Direct Reduction Corporation, New York, N.Y.

[21] Appl. No.: 250,015

[22] Filed: Apr. 1, 1981

[51] Int. Cl.³ .......................................... G01K 13/08
[52] U.S. Cl. .................... 374/154; 374/137; 374/167; 374/186; 250/231 SE; 340/870.17; 340/870.29
[58] Field of Search .................. 73/351, 341, 343.5; 250/231 SE; 340/870.29, 870.11, 870.17; 374/154, 153, 137, 166, 167, 186

[56] References Cited

U.S. PATENT DOCUMENTS

| | | | |
|---|---|---|---|
| 2,818,172 | 12/1957 | Mills | 73/343.5 |
| 3,331,247 | 7/1967 | Joepell | 73/351 |
| 3,379,062 | 4/1968 | Sellep | 374/153 X |
| 3,619,612 | 11/1971 | Belke | 374/154 X |
| 4,031,386 | 6/1977 | Recker | 250/231 SE |
| 4,096,383 | 6/1978 | Mancini et al. | 250/231 SE |

FOREIGN PATENT DOCUMENTS 720319   3/1980   U.S.S.R. ............................ 374/153

Primary Examiner—E. R. Kazenske
Assistant Examiner—Thomas P. Noland
Attorney, Agent, or Firm—Thomas P. Dowd

[57] ABSTRACT

A system for correlating condition-indicative signals fed sequentially from a series of sensors, such as thermocouples installed in ports on the surface of a rotating kiln at various longitudinal and angular coordinates along the total length of the kiln, with the signals printout on a multipoint recorder mounted remotely from the kiln is disclosed wherein two photoelectric devices are disposed at fixed points adjacent the kiln for sensing the passage of a series of sensor-location indicator tabs mounted on and rotating with the kiln. The series of indicator tabs are spaced circumferentially about the kiln shell, preferably in respective radial plane alignment with the series of sensors, so as to produce a sequenced series of signals in response to the continuous passage of the tabs past one of the photoelectric devices, which signals are communicated from the device to the multipoint recorder to sequence the print mechanism on the receiving recorder and thus correlate the sequenced condition signals with the sensor locations. A single reset tab is also disposed on the kiln and activates the other photoelectric device which produces a recorder reset signal for every revolution of the kiln.

13 Claims, 3 Drawing Figures

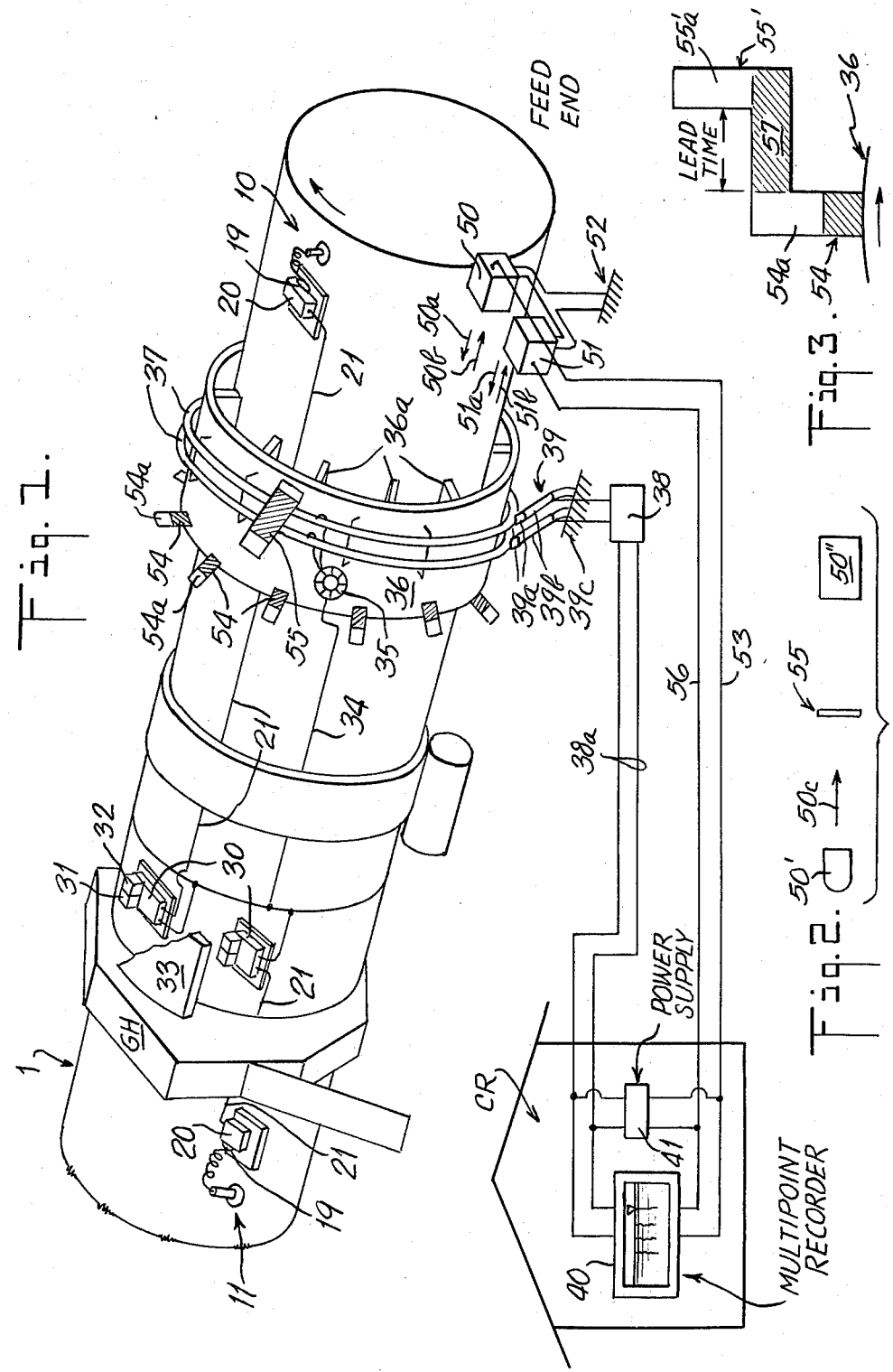

SYSTEM FOR CORRELATING A SIGNAL SENSOR LOCATION WITH A RECORDER PRINTOUT

BACKGROUND OF THE INVENTION

The present invention relates to a system for correlating a series of signals fed sequentially from a number of sensors with the printout of the signals on a remote recorder and more particularly to a method and means for monitoring the operation of rotary kilns for example, of the type used for directly reducing metal oxides with solid carbonaceous materials as the source of fuel and reductant, by sensing the internal kiln conditions, such as temperatures, and displaying the sensed results at a remote location on a multipoint recorder wherein the signals are properly sequenced to correlate the sensing position on the kiln with the sensed signal on the recorder.

Temperature sensing and control is essential to the proper operation of a rotary kiln carrying out a direct reduction process such as the reduction of iron ores to directly reduced iron (DRI) or sponge iron using coal as the fuel and reductant. The temperatures within the kiln must be regularly sensed and accurately displayed to permit the kiln operators to supervise the process and initiate any necessary process changes or corrections promptly. The temperature sensors for this purpose have typically been thermocouples which are disposed at spaced locations along the length of the kiln and which transmit low level millivolt signal data from each location on the rotating kiln to a recorder in a central control room. The common technique has been to transmit the signals over fixed wires routed from each of the thermocouples along the kiln shell to a set of slip rings at a convenient central location on the kiln. The signals are then transferred from the slip rings, through a set of sliding shoes at a stationary location adjacent the kiln, and routed over further wires to the control room recorder. An example of a prior art system of this type is shown in U.S. Pat. No. 3,331,247 to Toepell wherein temperature indicative millivolt signals are generated from a number of thermocouples on a kiln, each of which thermocouples has one terminal connected to a common continuous slip ring mounted on the kiln and another terminal connected to a separate segment of a segmented slip ring. A mechanically-actuated recorder switching system is also mounted on the kiln to permit transfer of the thermocouple signal voltages to an external receiver in a sequential sampling sequence through brushes contacting the two slip rings. The switching system must activate a print mechanism on the receiving recorder to ensure correct sequencing and correlation between the recorded signal and the proper thermocouple location. Other mechanical and/or magnetic proximity switching activated by tabs or levers on the kiln have been used in this application, but these prior art systems have been plagued with a number of problems. Since such kilns expand as they are heated and contract when rained upon, and move forward and backward in normal operation, the movement between tabs on the kiln and pickups fixed adjacent the kiln results in broken switch arms, destroyed switches, the need for spacing adjustments, and other heavy maintenance requirements. Even with frequent calibrations and thorough understanding of the system, accurate interpretation of the data is difficult, and as calibration verification is normally accomplished with the kiln stopped, errors due to the sliding action between the rings and the stationary shoes during kiln operation are not taken into consideration.

The present invention is directed to providing a system which eliminates many of the problems inherent in such prior art temperature-measuring systems and which is particularly suitable for use with a thermocouple system such as disclosed in copending U.S. application, Ser. No. 250,006, assigned to the same assignee as the present application.

SUMMARY OF THE INVENTION

The present invention provides a system for correlating sequenced thermocouple signals being picked off a rotating kiln with a printout on a remotely located multipoint recorder by using photoelectric elements located off the kiln in combination with a number of indicator tabs on the kiln and more particularly wherein the tabs are so positioned as to interact during their rotation with the kiln with two beams of light that are sensed by two photo-optical units placed adjacent the kiln beyond the maximum limits of kiln expansion and longitudinal movement. One beam of light interacts with a series of tabs which correspond in number and radial position with the set of thermocouples mounted on the rotating kiln, to produce signals which correlate the printout of the successive signals from the respective thermocouples on the multipoint recorder in the proper sequential order, while the other light beam interacts with a single reset tab, once during each revolution of the kiln, to reset the recorder after each set of thermocouple printouts.

With the system of the present invention mechanical contacts are eliminated and switch and tab spacing criticality is obviated.

BRIEF DESCRIPTION OF THE DRAWINGS

FIG. 1 is a diagrammatic view illustrating a rotary kiln fitted with a thermocouple system and a cooperating correlation system in accordance with the present invention and an associated recorder apparatus disposed in an appropriate control room.

FIG. 2 illustrates an alternative photoelectric system for sensing the passage of an indicator tab.

FIG. 3 illustrates a preferred construction for the reset tab in combination with a position tab in the correlation system of the present invention.

DETAILED DESCRIPTION OF THE INVENTION

A rotary kiln fitted with a thermocouple system, of a type particularly suitable for use with the present invention and an associated recorder apparatus disposed in an appropriate control room are illustrated in FIG. 1 along with an embodiment of the invention.

Firstly, the thermocouple system comprises a series of thermocouple elements installed at designated longitudinal and angular positions along the total length of the kiln 1. Two such thermocouples 10 and 11 are shown for descriptive purposes, but, typically twelve such thermocouples may be disposed at spaced intervals both axially and circumferentially on the kiln shell. Mounted adjacent each thermocouple, for example, on a respective four inch heat-shielding standoff is a junction box 20 with a receptacle that receives a plug 19 on the thermocouple apparatus. Within the junction boxes 20 terminal strips may be used for connecting the leads from the receptacles to respective thermocouple output cables 21 which are routed along the kiln shell for carrying out millivolt signals indicative of the temperature sensed by each thermocouple element.

The millivolt signal resulting from the temperature sensed by thermocouple element 10, for example, is routed from its junction box 20 along its cable 21 to a second junction box 30 disposed at a convenient central location on the kiln allowing 360° angular access thereto. This location may conveniently be just ahead of the kiln gear housing GH on the charge feed end of the kiln as shown in FIG. 1. At this central location a series of individual junction boxes, such as the box 30, are provided for respectively receiving each of the twelve individual thermocouple signals over lines 21 from the boxes 20. This second set of junction boxes (30) may also be mounted on four inch heat-shielding standoffs conveniently disposed circumferentially around the kiln in the same angular or radial plane as the respective individual thermocouples from which the received signals are routed such as shown in FIG. 1 with regard to thermocouples 10 and 11.

Associated with each of the junction boxes (30) is a set or pair of proximity switches 31, 32 each mounted above a respective junction box so as to be activated by a stationary curved steel plate 33 mounted, for example, on the kiln gear housing GH. As the kiln 1 rotates the switches 31, 32 on each junction box are successively activated by the stationary plate 33 so that the sets are actuated in sequence. The curved steel plate 33 may be conveniently located circumferentially about the kiln and extends through an arc of about 30°.

Two heavy-duty magnetic proximity switches of the single-pole, single-throw type may be used for switches 31, 32, one for each thermocouple lead contained in cable 21. At the junction box 30 the positive lead from thermocouple 10 is routed to an open contact in one proximity switch (31), and the negative lead to an open contact in the second proximity switch (32). The mating contacts in both proximity switches are routed back to the junction box and terminated on individual terminals separated from each other and the incoming signal from the thermocouple 10. Accordingly, the thermocouple signal is separated or isolated until the proximity switches 31, 32 are activated and permit the signal to pass on. The leads of like polarity in each junction box 30 are looped individually from junction box to junction box to form a continuous or common circuit circumferentially around the kiln 1 in a manner such as disclosed in previously noted U.S. copending application Ser. No. 250,006. At a convenient location, a cable 34 containing leads of each polarity is routed from the common loops to a millivolt-to-milliamp converter 35, preferably located on a heat shield 36 which is used for mounting a set of continuous slip rings 37 on the kiln 1. The slip ring heat shield 36 completely encircles the kiln 1 at a distance preferably of about six inches from the kiln shell surface. The heat shield 36 thus acts as the mounting surface for both the millivolt-to-milliamp converter 35 and the slip ring apparatus 37 and, as will be seen, may be conveniently used to also mount the tab system of the present invention.

The millivolt-to-milliamp converter 35 receives incoming millivolt thermocouple signals from the common loops, which signals are sequenced by the proximity switches into a series of signals each indicative of the temperature sensed by each successive thermocouple. Each of these millivolt signals is converted to a directly proportional milliamp signal by converter 35. The output signals from the converter 35 are impressed across the set of slip rings 37, one ring being connected to a positive lead and the other connected to a negative lead. Each of the rings in the set 37 is continuous and attached to the heat shield 36 so as to completely encircle the kiln. The output signals are transferred from the set of slip rings 37 to a stationary junction box 38 adjacent the kiln by the use of an appropriate pick-off arrangement 39 comprising a set of contact brushes or sliding shoes 39a attached to flexible arms 39b mounted on a stationary stand 39c. From the stationary junction box 38 the converted thermocouple signals may be routed by means of a cable 38a into a central control room CR to the input of a typical multipoint recorder 40 using standard two-conductor instrumentation shielded cabling. In order to operate the millivolt-to-milliamp converter 35 a 24-volt direct current may be applied at the slip rings 37 through the pick-off arrangement 39 by a source 41 which is part of the recorder 40 input circuitry in the control room CR so that a D.C. voltage may also be impressed on the incoming signal circuit thereby.

Multipoint recorder 40 receives the sequenced signals and depending on the input requirements of the actual recorder used, it may be necessary to reconvert the milliamp signal to a standard voltage signal, typically from 0-5 volts, using a resistor network at the input to the recorder 40, as will be defined by the manufacturer. The recorder 40 also may require modification if it is designed to accept multiple inputs directly, in which event all the inputs will have to be made to receive the signals over the single input cable 38a and the recorder adapted to printout in correlation with kiln rotation and the position of signal origin. The system of the present invention is suited to carry out this correlation function by appropriately keying the recorder printout and will now be particularly described.

As seen in FIG. 1, the correlation or keying system involves the combination of two photoelectric devices 50 and 51 mounted on a fixed support 52 adjacent the kiln 1 and respectively cooperating with a series of position or indicator tabs 54 and a reset tab 55 mounted on and rotating with the kiln. The set of tabs 54 operate to provide a correlation with the set of thermocouples disposed on the kiln 1 so that the tabs will correspond in number to the number of thermocouples, that is twelve in the present embodiment, and will be circumferentially spaced from each other in accordance with the spacing of the thermocouples. These tabs 54 may be conveniently mounted on the slip ring heat shield 36 and circumferentially arranged with respect to the junction boxes 30 in a manner as will be described.

The tabs in the embodiment shown in FIG. 1 extend upwardly from the outer surface of the heat shield 36 and have portions 54a on their lateral surfaces which are light reflective. The photoelectric device 50 is of the type incorporating a lamp for projecting a light beam 50a outwardly therefrom and a photosensor which provides an electrical signal in response to receiving the light beam when the beam 50b is reflected back to the device. The device 50 is disposed adjacent the kiln in such manner that its projected light beam 50a will be reflected back onto the photosensor by the reflective surfaces 54a on the tabs 54 as the tabs rotate with the kiln. Consequently, during operation, the device 50 will produce twelve spaced electrical signals, in response to the passage of the series of tabs 54, for each rotation of the kiln. This sequenced series of signals, accordingly correlated to kiln rotation, are conducted by a cable 53 to the multipoint recorder 40 and are used to key the recorder in such manner as to jump the recorder readout through twelve steps across the recording chart.

To correlate each recorder printout with the temperature indicative signals from the series of thermocouples on the kiln, the photoconductor system should be located relative to the indicator tabs 54, and the tabs 54 so disposed on the kiln with respect to the junction boxes 30, that a keying signal will be produced by the device 50 just prior to the switching of each thermocouple output signal through converter 35 to the slip rings 37. Conveniently, the indicator tabs 54 may be circumferentially aligned with the junction boxes 30 on the kiln surface for this purpose, but it will be seen that physical alignment is not necessary as long as the tab spacing is such as to correspond, when reflecting beam 50a, to the spacing of the junction boxes 30, since the proximity switches 31, 32 on the boxes 30 control the sequencing of the thermocouple signals. Accordingly, in order to be able to determine from what point on the kiln 1 the particular signal being read out on the multipoint recorder 40 is being transmitted it is necessary when assembling the system to correlate the positioning and connections between each thermocouple and its respective junction box 30, and the location of a particular indicator tab 54 with respect thereto. However, the specific positioning of any one of the three may be selected or varied in a manner to accommodate to the kiln environment. Similarly, the dimensioning of the indicator tabs 54 may be designed to accommodate for kiln expansion and longitudinal movement, for example, by selecting the length of the reflective surfaces 54a thereon and positioning the device 50 accordingly.

When a series of signals has been printed out on the multi-point recorder 40 corresponding to the temperatures sensed at each of the twelve thermocouple locations it is necessary to reset the recorder to begin another set of sequenced readouts. For this purpose, in keeping with the invention, the other photodetector device 51, which may be identical in form to the device 50 and also disposed on the fixed mounting 52 is used in combination with a separate indicator tab 55 that is disposed on the kiln at a suitable position such as with the tabs 54 on the slip ring heat shield 36. Tab 55, which also may have a reflective portion 55a, will be so disposed as to reflect the beam 51a back to device 51 once during each revolution of the kiln 1. Reflected beam 51b will then produce a reset signal which is carried over cable 56 to the multipoint recorder 40 to reset the recorder. Tab 55 and device 51 are so located as to produce each reset signal after readout of the signal from the twelfth thermocouple and before the readout of the signal from the first thermocouple in the set.

An important advantage of the keying system of the present invention is its versatility of arrangements so that in addition to the embodiment shown in FIG. 1, a number of alternative arrangements are possible. For example, rather than using a series of upstanding tabs, as tabs 54, on heat shield 36 to produce the series of keying signals, the heat shield supports 36a may be used for this purpose by properly spacing twelve supports and rendering their edges light reflective, such as by the application of silver paint. Photoelectric device 50 would be appropriately placed to project and receive the signal producing light beam. In this alternate embodiment the reset signal arrangement may also be altered such as by having the reset tab 55, as shown in FIG. 2 break a light beam, 50c directed from a displaced source 50 onto a photo-sensor unit 50" on support 52, rather than reflecting the beam back to a sensor unit.

A further embodiment may dispense with all the reflective surfaces on the tabs and have all the tabs interrupt a light beam since the tab 55 on the outer surface of the heat shield 36 would not interfere with the path of a beam directed to the photosensor in photoelectric device 50 or another sensing unit so positioned when the heat shield supports 36a are used as the indicator tabs.

A preferred embodiment for the reset tab structure and location is illustrated in FIG. 3 wherein reset tab 55' is mounted on one of the indicator tabs 54 by means of a suitable connector arm 57. The reflective faces 54a and 55'a of the tabs are arranged in the respective paths of the light beams 50a and 51a, so that the photoelectric devices 50 and 51 will be operated in the manner as described in connection with the system of FIG. 1. The tab 54 shown in FIG. 3 is preferably the tab corresponding to the first thermocouple in the set of twelve and the rotation of the kiln and structure is to the right in the figure. Accordingly the passage of tab 55' through the beam 51a will cause photoelectric device 51 to produce a reset signal for resetting the readout of recorder 40 just prior to the keying of the recorder by the signal from photoelectric device 50 to print out the signal from the first thermocouple. The length of the arm 57 may be adjustable and set in accordance with the necessary lead time required to reset the recorder prior to beginning a new series of printouts from the set of twelve thermocouples. Alternatively, arm 57 and tab 55' may be mounted on the indicator tab corresponding to the twelfth thermocouple in the manner shown in FIG. 3 but in which event rotation of the system would be in the opposite direction from that indicated.

It will accordingly be seen that the system of the present invention provides a recorder keying system for correlating the location of origination of a condition indicative signal from a rotary kiln with the signal printout on a remotely disposed recorder, which system compensates for kiln expansion and longitudinal movement while obviating the mechanical contacts and critical positioning on the kiln.

I claim:

1. A system for correlating the readout on a stationary recorder of a series of electrical signals, originating on a rotating cylindrical body and communicated in sequence to said recorder, with the relative locations of origin of each of said signals on said rotating body comprising:

a plurality of means spaced from each other on said body, for respectively producing said signals on said series;

continuous conductor means surroundingly mounted at a selected axial location on said body for receiving all of said signals in the series, and pickoff means off said body for conducting said signals from said conductor means off said body and to said recorder;

switching means, disposed on and rotating with said body, for controlling the sequential communication of said signals between their locations of origin and said conductor means in accordance with the rotational speed of said body;

indicating means, disposed on and rotating with said body, for indicating the relative locations of origin of each of said signals in the series;

photoelectric means, disposed adjacent said rotating body and responsive to the passage thereby of said indicating means rotating with said body, for producing keying signals indicative of each passage of said indicating means thereby; and means for communicating said keying signals from said photoelectric means to said recorder;

and wherein said indicating means comprises a series of indicators spaced circumferentially from each other on said body in accordance with the sequence spacing of said signals by said switching means and so disposed with respect to said photoelectric means that said keying signals are communicated to said recorder in sequence to actuate said recorder just prior to the receipt and readout of each of said signals in the series on said recorder so that each signal readout is correlated with its relative location of origin on said body; and means for resetting said recorder after the readout of each series of signals is completed.

2. A system as in claim 1 wherein said locations of origin are spaced axially and circumferentially from each other on said body and said series of indicators correspond in number to the locations of origin of said signals in said series and are spaced from each other in accordance with the circumferential spacing of the locations of origin of said signals on said body.

3. A system as in claim 2 wherein said indicators comprise a series of upstanding members mounted about the periphery of said body.

4. A system as in claim 1 wherein said switching means comprises a series of switches corresponding in number to the locations of origin of said signals in said series and disposed about the periphery of said body and wherein said indicators are respectively aligned with said series of switches circumferentially on said body.

5. A system as in claim 1 wherein said rotating body comprises a kiln and said means for producing said series of signals comprises thermocouple means for sensing temperatures in the interior of said kiln.

6. A system as in claim 1 wherein said resetting means comprises:

reset indicating means disposed on and rotating with said body at a circumferential location between two of said series of indicators;

second photoelectric means, disposed adjacent said rotating body and responsive to the passage of said reset indicating means thereby;

means for producing a reset signal after each series of signals corresponding in number to the number of locations of origin of said signals is completed; and means for communicating said reset signals to said recorder to reset it after the readout of each series of signals is completed.

7. A system for recording in sequence a number of condition-indicative signals originating from a respective number of different locations on a rotating cylindrical body, such as a rotary kiln, comprising:

a plurality of sensing means disposed on the kiln at axially and circumferentially spaced locations from each other for sensing internal kiln conditions and producing respective electrical signals indicative thereof;

recording means disposed off said kiln for recording said respective condition-indicative signals in sequence;

transfer means for transferring said condition-indicative signals from said kiln to said recording means and comprising:

a set of continuous electrical conductors mounted on and surrounding said kiln for receiving said electrical signals from said sensing means; and means off said kiln for picking off said signals from said conductors and conducting said signals to said recording means;

switching means disposed on and rotating with the kiln for transferring said condition-indicative signals from said sensing means one at a time in sequence to said conductors of said transfer means;

indicator means disposed on and rotating with said kiln for indicating the relative circumferential locations of said sensing means on said kiln;

photoelectric means disposed adjacent said kiln and responsive to the passage thereby of said indicator means rotating with the kiln, for producing keying signals indicative of each passage of said indicator means thereby; and means for communicating said keying signals to said recording means;

and wherein said sensing means, said switching means and said indicator means are disposed circumferentially on the kiln periphery such that said keying signals are respectively communicated to said recording means just prior to the receipt of each of said condition-indicative signals to separate and correlate the readout of said condition-indicative signals with their respective sensing means on said recording means.

8. A system as in claim 7 wherein said indicator means comprises a series of indicator tabs circumferentially spaced on said kiln in accordance with the spacing of said sensing means, and said photoelectric means comprises a photosensor which produces a keying signal upon the passage of each indicator tab through a fixed point, said tabs and photosensor being so disposed as to produce a keying signal in sequence with the transferring of each condition-indicative signal to said recording means.

9. A system as in claim 8 further comprising a second photoelectric means disposed adjacent said kiln; and reset tab means disposed on and rotating with said kiln and passing a given point once during each rotation of the kiln, said second photoelectric means providing a reset signal to said recording means upon each passage of the reset tab means past said point.

10. A system as in claim 8 wherein said indicator tabs have reflective surfaces thereon that reflect a light beam projected by said photoelectric means back to said photoelectric means to produce said signals.

11. A system as in claim 7 wherein said photoelectric means comprises means for projecting a light beam and said indicator means comprises means for interracting with said light beam.

12. A method for correlating the readout on a recorder of a series of electrical signals communicated in sequence thereto with the relative locations of origin of each of said signals on a rotating body comprising the steps of:

providing the series of signals in sequence to a set of continuous conductors surrounding the rotating body;

picking the signals off the continuous conductors in sequence and communicating said signals to the recorder;

disposing a series of indicators for indicating the relative locations of origin of each of said signals on the rotating body;

photoelectrically detecting the passage of each of said indicators past a fixed detection point during rotation with the body and producing keying signals indicative of each passage;

communicating said keying signals to said recorder; and disposing said indicators such that they pass said detection point and produce said keying signals in a sequence received at said recorder just prior to the receipt and readout of each of said series of signals on said recorder so that each signal readout is correlated with its relative location of origin;

disposing a reset indicator on the rotating body;

detecting the passage of said reset indicator past a point during each rotation with the body and producing a reset signal indicative of each passage; and communicating each reset signal to said recorder to reset the recorder after each series of signals corresponding to all of the locations of origin of said signals is completed.

13. The method of claim 12 wherein the photoelectric detection step comprises the interraction of a light beam with the indicators.

* * * * *